United States Patent [19]

Mergner

[11] Patent Number: 4,478,527
[45] Date of Patent: Oct. 23, 1984

[54] TEMPERATURE COMPENSATION FOR ZERO AND SPAN CHANGES IN A MEASUREMENT CIRCUIT

[75] Inventor: George C. Mergner, Glenside, Pa.

[73] Assignee: General Signal Corporation, Stamford, Conn.

[21] Appl. No.: 446,122

[22] Filed: Dec. 2, 1982

[51] Int. Cl.³ .............................................. G01K 7/00
[52] U.S. Cl. ................................... 374/172; 330/256; 330/289
[58] Field of Search ........................ 307/310; 374/172; 330/256, 289; 324/105; 328/3

[56] References Cited

U.S. PATENT DOCUMENTS

| | | | |
|---|---|---|---|
| 3,691,405 | 9/1972 | Kendell | 328/3 |
| 4,215,317 | 7/1980 | Traynor | 330/256 |
| 4,326,171 | 4/1982 | Shaw et al. | 330/256 |
| 4,352,053 | 9/1982 | Oguchi et al. | 330/256 |

Primary Examiner—Charles Frankfort
Assistant Examiner—David R. Schuster
Attorney, Agent, or Firm—William G. Miller, Jr.; Raymond F. MacKay; Harold Huberfeld

[57] ABSTRACT

There is provided a differential amplifier having a plurality of inputs connected through input resistors to a summing junction at the inverting input of a differential amplifier which also has a negative feedback path having a feedback resistor. One of the input resistors is connected to the output signal of the primary element or transducer. A second of the input resistors is connected to a zero compensating signal which varies with changes in the temperature of the transducer from a certain value at a reference temperature. A third input resistor is connected to a fixed signal of a value which is adjusted to correspond to the certain value of the compensating signal at the reference temperature but of opposite polarity so as to tend to cancel the compensating signal when the transducer is at the reference temperature. The combination of the three inputs then produces an output from the differential amplifier corrected for changes in the zero of the measurement due to temperature changes.

4 Claims, 1 Drawing Figure

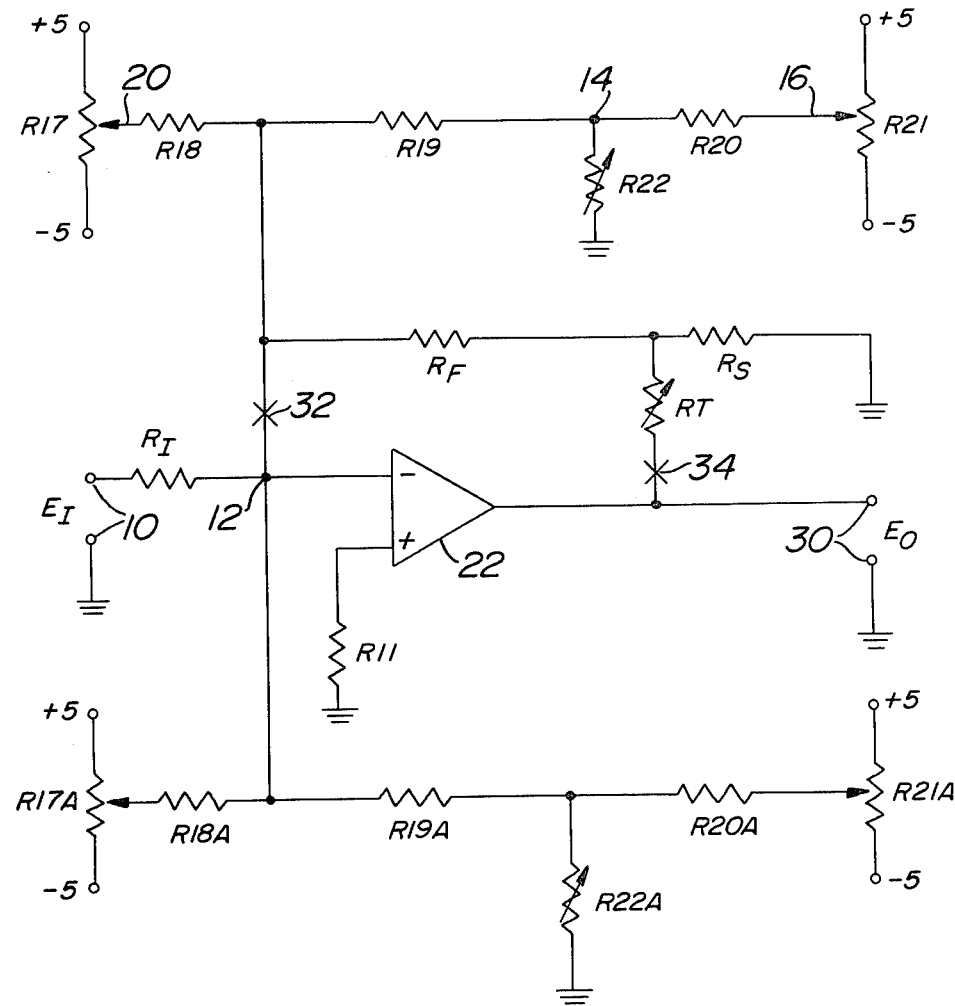

TEMPERATURE COMPENSATION FOR ZERO AND SPAN CHANGES IN A MEASUREMENT CIRCUIT

BACKGROUND OF THE INVENTION

This invention relates generally to circuits for compensating for the temperature characteristics of primary elements for measuring various physical quantities.

The temperature characteristics of primary elements usually require compensation in order to preserve the accuracy of the measurement over a wide range of ambient temperatures. An example of such a primary element is the differential pressure cell which is used in the measurement of fluid flows. A representative differential pressure cell is shown and described in U.S. Pat. No. 4,257,274. That particular transducer has a silicon diaphragm anodically bonded between two glass plates to form a pair of capacitors on opposing sides of the diaphragm. The capacity exhibited by these capacitors varies in an opposite sense with changes in differential pressure. Typically these transducers are utilized in a measuring circuit which serves to provide a signal which varies in proportion to the change in capacity relative to the total capacity, $\Delta C/\Sigma C$.

The temperature changes which occur in differential pressure cells as well as other primary elements due to changes in ambient temperature conditions under which the elements operate, causes a variation in the change in the output voltage of the cell with changes in the quantity being measured. Such changes are usually referred to as a change in "span". For example, in a differential pressure cell, the range over which the differential pressure cell output changes with a particular change in differential pressure will vary with temperature. Therefore the "span" will require adjustment or compensation.

The temperature coefficient of the primary element also usually causes a change in the offset voltage of the element. Thus, for example, a differential pressure cell will normally exhibit a particular output voltage at a reference temperature for a certain value of differential pressure. However, that offset voltage will vary with temperature and thereby create a need for compensation. These offsets are frequently referred to as the "zero" since they usually represent the output at the lower end of a range of measurements. The range then represents the "span".

Prior art circuits for providing temperature compensation of span have utilized thermistors placed in the voltage supply to the bridge circuit of the differential pressure cell. This provided a resulting change in the excitation voltage across the transducer to compensate for any changes in the output of the transducers which occurred with changes in temperature. The thermistor maintained the excitation across the cell at the desired value by varying its resistance with temperature.

U.S. Pat. No. 4,326,171 describes a temperature compensating circuit wherein a thermistor is used to maintain a constant excitation voltage in the manner described above. Circuits of the type shown in this patent tend to be expensive because of the need for using precision components and using complex trimming procedures in order to cause the circuit in which the thermistor is inserted to provide the desired temperature characteristics.

The electronic measuring circuit associated with the primary element may itself exhibit a significant "zero" shift with temperature.

SUMMARY OF THE INVENTION

It is an object of the present invention to provide a temperature compensating circuit for compensating the output of a primary element for variations in span and zero due to temperature changes, and independent compensation of variations in zero of associated electronic measuring circuitry.

It is another object of this invention to provide a simple and inexpensive temperature compensating circuit which provides increased accuracy of compensation without the expense which normally accompanies such accuracy.

In carrying out this invention, there is provided a differential amplifier having a plurality of inputs connected through input resistors to a summing junction at the inverting input of a differential amplifier which also has a negative feedback path having a feedback resistor. One of the input resistors is connected to the output signal of the primary element or transducer. A second of the input resistors is connected to a zero compensating signal which varies with changes in the temperature of the transducer from a certain value at a reference temperature. A third input resistor is connected to a fixed signal of a value which is adjusted to correspond to the certain value of the compensating signal at the reference temperature but of opposite polarity so as to tend to cancel the compensating signal when the transducer is at the reference temperature. The combination of the three inputs then produces an output from the differential amplifier corrected for changes in the zero of the measurement due to temperature changes. Fourth and fifth inputs similar to the second and third inputs may be added for independent zero compensation of the electronic measuring circuitry. In addition, means are provided for varying the negative feedback signal with changes in the transducer temperature to compensate for changes in the span due to transducer temperature variations.

A BRIEF DESCRIPTION OF THE DRAWINGS

The FIGURE shows a circuit diagram of one form of the temperature compensating circuit of this invention.

BRIEF DESCRIPTION OF THE PREFERRED EMBODIMENT

The FIGURE shows a circuit which receives an input voltage $E_I$ from a transducer which is subject to span and zero shifts when temperature changes occur. An input resistor $R_I$ is connected between the input terminals 10 and a summing junction 12 so that the input voltage $E_I$ is summed with other voltages such as the voltage introduced through the resistor R19 which provides a second input to summing junction 12.

The second input is a compensating signal which varies with changes in the temperature of the transducer since the signal as it appears at junction 14 varies with temperature as a result of variations in the resistance of resistor R22 with temperature. Resistor R22 in conjunction with resistor R20 forms a voltage divider which provides a variable division of the voltage output appearing at the tap 16 of potentiometer R21. As shown in FIG. 1, the potentiometer R21 is connected between a positive and negative voltage supply, shown in the FIGURE as being −5 and +5 volts.

The temperature varying resistor R22 is shown as a variable resistor since its resistance varies with temperature. It may, for example, be a resistance element of the type described in U.S. patent application Ser. No. 126,068, filed Feb. 29, 1980, which is incorporated herein by reference.

A third input to the summing junction 12 is provided through resistor R18 from the tap 20 of potentiometer R17 as shown in the FIGURE. Potentiometer R17 is connected between a positive and negative 5 volt supply.

Since the summing junction 12 is connected to the inverting input of differential amplifier 22, whose non-inverting input is connected through resistor R11 to ground, the inputs through the three summing resistors $R_I$, R18, and R19, are summed to provide a compensation for changes in the zero of the transducer being used to produce the voltage $E_I$. This compensation is provided by adjusting the potentiometer taps 16 and 20 in accordance with the procedure set forth below.

If tap 16 is moved from its center or zero voltage output position, a temperature dependent voltage will appear across R22. That voltage will be of a magnitude approximately proportional to the deviation of the tap 16 from its center position and the polarity will be dependent upon the direction of the change in tap 16. The voltage across R22 will cause a proportional current which is settable in magnitude and polarity to flow into the summing junction 12 and thus provides a predictable variation of that current with temperature.

The temperature coefficient of resistor R22 is, of course, of known value and provides a linear variation in the voltage at junction 14. The coefficient as represented by the changing voltage across resistor R22 is somewhat reduced by variations of the current through R22 itself because of the effective source resistance of R21 and R22. This effect, of course, is calculable and can be compensated.

It is thus evident that a given position of the tap 16 will provide an input current to amplifier 22 whose variations with temperature is known. To properly set this current for temperature compensation of the zero shift, the zero shift in the output at terminals 30 without compensation (with the tap 16 centered) is measured for a known temperature change at the primary element, such as 100° F. The primary element is then returned to the reference temperature. The output should return to zero. The tap 16 is then moved to cause the output of the amplifier 22 at its output terminals 30, namely $E_o$, to be in an opposite direction by an amount calculated to cause a change in output over the known temperature span of 100° F., for example, to equal the previously measured offset. The tap 20 of potentiometer R17 is then positioned to return the output reading $E_o$ to zero. The proper compensation of the zero should then obtain.

It is important that the compensating circuit be designed so that the voltage across R22 is at least in the range of hundreds of millivolts so that the compensating current will not be significantly influenced by possible changes in the zero offset of the amplifier 22 with the temperature change.

A temperature compensation for variations in span is achieved by this invention by the use of a negative feedback network which includes resistors RF, RT, and RS which serve to vary the gain of the amplifier 22 in a linear manner with changes in temperature. Differential pressure transducers such as those mentioned previously using silicon diaphragms typically exhibit a negative temperature coefficient, i.e., $\Delta C/\Sigma C$ decreases with increasing temperature. Therefore, to provide temperature compensation for span changes with temperature, the circuit of the FIGURE provides a positive coefficient. It is, of course, possible to modify the circuit to provide a decrease of gain with increase of temperature as will be described later.

The gain of amplifier 22 is in part determined by RF, RT, and RS. If RS is open circuited and RT is short circuited, the circuit of the FIGURE becomes a simple operational amplifier with a feedback resistor which may, for convenience, be denoted $R_F'$. The input circuit through $R_I$ to amplifier 22, which is proportional to $\Delta C/\Sigma C$, for example, may be set to produce a 0–1 volts D.C. output $E_o$ for full span of $\Delta C/\Sigma C$ with RF equal to 1.45 megohms. If RS and RT are added, RT being a resistor whose resistance varies with temperature with a positive temperature coefficient, it may be seen that a proportionally greater D.C. voltage will be developed at the output $E_o$ as temperature increases for any non-zero input to the inverting input of amplifier 22, thereby effecting a gain increase in the circuit of amplifier 22. The attenuation of the feedback by resistors RS and RT will itself cause a gain increase even at the reference temperature. Therefore, RF with RS and RT in the circuit must be less than $R_F'$ if a 1 volt output at full scale is retained at reference temperature. A quantitative derivation of these effects is set forth below.

$E_o$ = Output signal to be made independent of temperature $E_I$ = Input voltage proportional to $\Delta C/\Sigma C$, at reference temperature Let $R_O = R_T$ value at reference temperature $\Delta T$ = Test temperature minus reference temperature $\alpha$ = Temperature coefficient of $R_T$ over T $E_{I'}$ = Input voltage at test temperature D = Fractional change of $E_I$ over $\Delta T$ $$D = \frac{E_{I'} - E_I}{E_I} = \frac{E_{I'}}{E_I} - 1 \text{ and } \frac{E_{I'}}{E_I} = 1 + D$$

Equating currents at summing junction 12.

$$E_o \frac{\frac{RS}{RS + RT}}{RF} = \frac{E_I}{R_I}$$

G = Gain at reference temperature =

$$G = \frac{E_o}{E_I} = \frac{R_F}{R_I} \cdot \frac{RS + R_O}{RS}$$

G' = Gain at test temperature $$G' = \frac{E_o}{E_{I'}} = \frac{R_F}{R_I} \left[ \frac{RS + R_O(1 + \alpha \Delta T)}{RS} \right]$$

$E_o = E_I G = E_{I'} G'$ (for proper temperature compensation)

$$\frac{G}{G'} = \frac{E_{I'}}{E_I}$$

$$\frac{RS = R_O}{RS + R_O(1 + \alpha \Delta T)} = 1 + D$$

-continued
$$RS + RO = RS + RO + \alpha\Delta T\, RO + DRS + DRO(1 + \alpha\Delta T)$$

$$RS = \frac{RO[\alpha\Delta T + D(1 + \alpha\Delta T)]}{-D} = R_O\left[\frac{\alpha\Delta T - (1 + \alpha\Delta T)}{-D}\right]$$

If $R'_F$=Value of $R_F$ without temperature compensation, then at reference temperature, $$\frac{R'_F}{RI} = \frac{R_F}{RI}\left(\frac{RO + RS}{RS}\right)$$

$$RF = R'_F\left(\frac{RS}{RO + RS}\right)$$

$$= R'_F \frac{1}{1 + \frac{RO}{RS}}$$

$$= R'_F \frac{1}{1 + \dfrac{1}{\left[\dfrac{\alpha\Delta T}{-D} - (1 + \alpha\Delta T)\right]}}$$

Typical values may be
$R'_F$=1.43MΩ
$R_O$=5.412KΩ
$\alpha\Delta T$=0.172 (100° F., 0.0031/°C. @ 0° coeff.)
$D$=0.04 (4% over 100° F.)
$R_S$=16.94KΩ
$R_F$=1.084MΩ

If compensation for negative temperature dependence is desired, it can be obtained by making $R_S$ the temperature-dependent resistance (with positive coefficient) and $R_T$ temperature-independent.

By way of example, the values for the various circuit components of the FIGURE may be:

R11=500K
R17=100K
R18=10M
R19=10M
R20=10K
R21=100K
R22=5K (ice point resistance)
$R_I$=1M
$R_F$=1.084M
$R_S$=16.95K
$R_T$=5K (ice point resistance)

The resistors $R_T$ and R22 are preferably resistors which are small in size, inexpensive in cost, and with a stable and predictable resistance value as well as a stable and predictable linear temperature coefficient. Such resistors as the thin film elements described in U.S. patent application Ser. No. 126,068 fulfill these requirements.

It will be obvious to those skilled in the art that the temperature sensitive resistors R22 and $R_T$ will be physically located so that they are exposed to the same temperatures as the primary element or transducer whose output is being compensated.

Any zero shift in the electronic measuring circuit associated with the primary element may be compensated by the same means as used against transducer zero offset. However, it is desirable to be able to interchange transducers and electronics while maintaining adequate compensation of "zero" shift with temperature without further adjustment. Therefore, independent means of compensating "zero" offset for transducer and for associated measuring electronics is valuable. It is therefore desirable that the zero and span compensation elements for the transducer should be packaged so as to be a "plug-in" adjunct to the measuring circuitry, inasmuch as they must be connected and removed in conjunction with associated transducer. The plug-in connectors 32 and 34 are provided for this purpose. The zero compensation elements for the measuring circuitry are in "on-board" form, that is, a physically integral part of the measuring circuit. These elements are represented in the FIGURE by resistors 18A, 19A, 20A, and 22A, and potentiometers R17A and R21A. These elements and their interconnection are similar to those like numbered elements without the suffix A. There is thus provided fourth and fifth inputs which are similar to the second and third inputs respectively with the potentiometers being adjusted for zero shift in the measuring circuit.

What is claimed is:

1. In a system measuring the output of a transducer whose calibration has a span and a zero which vary with changes in its temperature, a circuit for simultaneously compensating the transducer output for such variations, comprising:

a differential amplifier having a plurality of inputs connected through input resistors to a summing junction at an inverting input of said amplifier and having a negative feedback path connected from an output of said amplifier to said inverting input;

a first of said input resistors connecting the transducer output to said summing junction;

a second of said input resistors connecting a compensating signal to said summing junction, said compensating signal being so generated that it varies from a certain value at a reference temperature with changes in the temperature of the transducer, said variations being of magnitude such that the output of said amplifier at the zero calibration point is insensitive to temperature changes at the transducer;

a third of said input resistors connecting a fixed signal to said summing junction, said fixed signal being adjusted to correspond to the value of said compensating signal at said reference temperature with an opposite polarity so as to cancel said compensating signal when the transducer is at said reference temperature, thereby compensating said transducer output for changes in zero due to temperature changes at said transducer; and means for varying said negative feedback circuit with changes in said transducer temperature to compensate changes in span for changes in transducer temperature.

2. A circuit as set forth in claim 1 in which said means for varying the negative feedback circuit includes
a feedback resistor connecting said output to said summing junction;
a temperature sensitive resistor in series with the feedback resistor; and
a resistor connecting the junction between said temperature sensitive resistor and said feedback resistor to ground.

3. A circuit as set forth in claim 1 or 2 in which said compensating signal is produced by a voltage divider which includes:
a fixed resistor and a temperature sensitive resistor connected in series; and a zero center voltage supply potentiometer with an adjustable tap, said series circuit being connected between said tap and ground.

4. In a system having a measuring circuit whose zero changes with temperature when measuring the output of a transducer whose calibration has a span and a zero which vary with changes in its temperature, a circuit for simultaneously compensating the transducer and measuring circuit changes with temperature, comprising:

a differential amplifier having a plurality of inputs connected through input resistors to a summing junction at an inverting input of said amplifier and having a negative feedback path connected from an output of said amplifier to said inverting input;

a first of said input resistors connecting the transducer output to summing junction which is in turn connected to the inverting input of said amplifier;

a second of said input resistors connecting a compensating signal to said summing junction, said compensating signal being so generated that it varies from a certain value at a reference temperature with changes in the temperature of the transducer, said variations being of magnitude such that the output of said amplifier at the zero calibration point is insensitive to temperature changes at the transducer;

a third of said input resistors connecting a fixed signal to said summing junction, said fixed signal being adjusted to correspond to the value of said compensating signal at said reference temperature with an opposite polarity so as to cancel said compensating signal when the transducer is at said reference temperature, thereby compensating said transducer output for changes in zero due to temperature changes at said transducer; and means for varying said negative feedback circuit with changes in said transducer temperature to compensate changes in span for changes in transducer temperature;

a fourth input resistor connecting another compensating signal to said summing junction, said other compensating signal being so generated that it varies from a certain value at a reference temperature with changes in the temperature of the measuring circuit, said variations being of magnitude such that the output of said amplifier at the zero calibration point is insensitive to temperature changes at the measuring circuit; and a fifth input resistor connecting another fixed signal to said summing junction, said other fixed signal being adjusted to correspond to the value of said other compensating signal at said reference temperature with an opposite polarity so as to cancel said other compensating signal when the transducer is at said reference temperature, thereby compensating said measuring circuit for changes in zero due to temperature changes at said measuring circuit.

* * * * *